Patented July 19, 1949

2,476,919

UNITED STATES PATENT OFFICE 2,476,919

SELF-HARDENING COMPOSITION OF UREA-FORMALDEHYDE RESINS AND A HYDRATED ALKALINE EARTH OXIDE

Herman A. Scholz and John K. Wise, Evanston, Ill., assignors to United States Gypsum Company, Chicago, Ill., a corporation of Illinois No Drawing. Application May 4, 1945,
Serial No. 592,066

4 Claims. (Cl. 260—71)

The present invention relates to a process of insolubilizing water-soluble urea-formaldehyde condensation products at about room temperature which comprises treating an aqueous solution thereof with a hydrated alkaline earth metal oxide, or with a material yielding such a hydrated oxide.

Urea and formaldehyde are capable of condensing with each other, either with or without catalysts, with the formation of condensation products which under suitable conditions, are capable of further condensing and polymerizing to form completely water-insoluble condensation products of a resinous nature. These urea-formaldehyde condensation products have been known for a considerable period and have found wide application in industry, for example as artificial resins, and also as the basis for, or an ingredient of, coating and adhesive compositions.

When used either as coatings or adhesives, for example as water paints or for laminating plywood and the like, it has been customary to employ a water-soluble form of a urea-aldehyde condensation product, either the relatively simple direct condensation product of these two ingredients known as dimethylol urea, or aqueous solutions of these condensation products, and to cause them to set or cure at room temperatures by the addition thereto of acid-reacting materials such either as acids themselves or salts which would yield acid either on hydrolysis or evaporation of the solution. Thus, it is common practice to cure or set urea-formaldehyde condensation product solutions by the addition thereto, for example, of ammonium chloride; as the solutions evaporate, free HCl is generated, which lowers the pH of the mixture and causes the resins to set. A number of coating compositions have been described in the literature in which the basis was such a urea-formaldehyde condensation product to which had been added suitable pigments and fillers and which were cured by the expedient of adding such an acid-developing substance. Quite frequently the pigments would interfere with the development of the proper acidity with the result that the products would not properly cure. Under many circumstances it would be very desirable if these urea-formaldehyde condensation products could be cured in the cold without rendering them acid. The use of alkaline catalysts for the initial formation of these resinous products is well known. However, the prior art teaches that the resins will not condense to a water-insoluble state at ordinary temperatures until they are rendered acid. The neutral or slightly acid solutions of the urea-formaldehyde condensation products can be cured by heating them.

Applicants have now discovered, however, the quite surprising fact that urea-formaldehyde resins can satisfactorily be cured by the addition of an alkaline earth hydroxide, for example either high calcium lime or dolomitic lime, using quantities which are far greater than catalytic quantities. The hydroxides of barium, strontium, and magnesium are also operative to effect the results. The present invention is applicable not only to paints and similar compositions, but also to adhesives such as laminating glues, sizes and the like.

As examples of compositions which have been found to cure in the cold, i. e. at about room temperature, may be mentioned the use of combinations of urea-formaldehyde resin and of lime in the form of calcium hydroxide or calcium-magnesium hydroxide resulting from the hydration of dolomitic limes.

In order to test out the invention, compositions were prepared and applied to a heavy cardboard upon which they were allowed to dry overnight at room temperature, whereafter the coating thus produced was abraded, while being kept wet, with No. 1 steel wool applied under constant pressure. The number of strokes required to remove the film from the cardboard to the extent of between one-third and one-half of the test area, was recorded as the "washability"; in other words, the greater the number of strokes required, the more complete had been the cure or setting of the urea-formaldehyde condensation product. For purposes of comparison, the urea-formaldehyde condensation product, merely dissolved in water, was also so tested, as was also a piece of cardboard to which the straight urea-formaldehyde resin had been applied, and the product then partially insolubilized by baking for an hour at 100° C. As a further comparison, some of the same urea-formaldehyde condensation product was cured by the addition of 5% of ammonium chloride at room temperature, and the washability of the coating thus produced tested on the same machine under the same conditions.

In making up the solutions the powdered urea-formaldehyde resin was merely dissolved in the amount of water stated in connection with the examples given hereinbelow; and after it had completely dissolved, there was then added the indicated quantity of the alkaline earth hydroxide as shown in the examples. Or, the dry powders may be mixed, and water added thereto. The films of this composition were then formed on the cardboard and allowed to dry as already mentioned.

The examples and the results obtained as as follows:

TABLE I

| Example | Materials Used | Parts | Washability strokes |
|---|---|---|---|
| 1 | Powdered urea-formaldehyde resin | 20 | 135 |
| | High calcium hydrate | 20 | |
| | Water | 28 | |
| 2 | Powdered urea-formaldehyde resin | 20 | 200 |
| | Pressure-hydrated dolomitic lime | 20 | |
| | Water | 25 | |
| 3 | Powdered urea-formaldehyde resin | 20 | 170 |
| | High calcium lime hydrate | 10 | |
| | Water | 16 | |
| 4 | Powdered urea-formaldehyde resin | 20 | 130 |
| | High calcium lime hydrate | 5 | |
| | Water | 15 | |
| 5 | Powdered urea-formaldehyde resin | 20 | 42 |
| | Water | 10 | |
| 6 | Powdered urea-formaldehyde resin | 20 | 65 |
| | Water (Baked 1 hour at 100° C.) | 10 | |
| 7 | Powdered urea-formaldehyde resin | 20 | 230 |
| | Ammonium chloride | 1 | |
| | Water | 10 | |

It will be seen from the above examples, Table I, that the use of equal parts of powdered urea-formaldehyde resin and of pressure hydrated dolomitic lime yielded a film which has a washability of 200, which compares favorably with the washability of an ammonium chloride cured film (Example 7). Note particularly the great increase in washability as compared with that of the air-dried resin, Example 5, which withstood only 42 strokes, and the same resin when baked for 1 hour at 100° C., Example 6, which stood up for 65 strokes.

Further examples are given hereinbelow (Examples 8 through 26) in which the amounts of lime were varied, using, for instance in Example 12, merely a saturated solution of calcium hydroxide. Examples 13 through 17 show the effects of barium hydroxide; Examples 18 through 21 the effects of strontium hydroxide; Example 22 of magnesium hydroxide; Examples 23 and 24 of pressure-hydrated dolomitic lime, which contains both calcium hydroxide as well as magnesium hydroxides; and Examples 25 and 26 two different types of cement which yield calcium hydroxide upon admixture with aqueous liquids.

TABLE II

Effect of various alkaline-earth hydroxides, 20 grams of dry urea-formaldehyde resin used throughout

| Example No. | | Setting Agent, Parts | Water, Parts | Washability, Strokes |
|---|---|---|---|---|
| 8 | High Calcium Hydrate | 20 | 28 | 135 |
| 9 | do | 10 | 15 | 244 |
| 10 | do | 5 | 13 | 180 |
| 11 | do | 1 | 11 | 190 |
| 12 | Saturated Solution of Ca(OH)$_2$ at 25° C | 10 | | 70 |
| 13 | Ba(OH)$_2$.8H$_2$O | 10 | 12 | 42 |
| 14 | do | 5 | 13 | 90 |
| 15 | do | 1 | 11 | 120 |
| 16 | Saturated solution of Ba(OH)$_2$ at 25° C | 10 | | 115 |
| 17 | ½ Saturated Solution of Ba(OH)$_2$ at 25° C | 10 | | 70 |
| 18 | Sr(OH)$_2$ | 10 | 13 | 90 |
| 19 | do | 5 | 14 | 115 |
| 20 | do | 1 | 11 | 160 |
| 21 | Saturated Solution of Sr(OH)$_2$ at 25° C | 10 | | 80 |
| 22 | Mg(OH)$_2$ | 10 | 15 | 100 |
| 23 | Pressure Hydrated Dolomitic Lime | 20 | 25 | 200 |
| 24 | do | 10 | 16 | 200 |
| 25 | Portland Cement | 10 | 8 | 190 |
| 26 | High Alumina Portland Cement | 10 | 8 | 170 |

From the foregoing examples it will be noted that some enhanced washability was obtained even with the use of 10 parts of a saturated solution of calcium hydroxide to 20 parts of the resin, yielding a product which withstood 70 strokes as against only 42 strokes for the material which had no alkaline-earth hydroxide added thereto at all (Example 6). It is also interesting to note that the more soluble alkaline earth hydroxides, namely barium hydroxide, must be used judiciously and not in too large amounts; as Example 13, in which 10 parts of Ba(OH)$_2$ were used with 20 parts of the urea-formaldehyde resin, had no better washability than the untreated Example 6. But with the use of 1 part of the barium hydroxide to 20 parts of the resin (Example 15), the product withstood 120 strokes; which was almost the same as when merely 10 parts of a saturated solution of Ba(OH)$_2$ had been used, as in Example 17.

Strontium hydroxide behaved quite similarly to barium hydroxide. Here also, too large an amount of the strontium hydroxide was undesirable, although even with 10 parts thereof to 20 parts of the resin (Example 18), the product still exceeded, in washability, the untreated resin of Example 6.

Pressure hydrated dolomitic lime, and the calcium-hydroxide-yielding cements, Examples 23 through 26 gave excellent results. Magnesium hydroxide alone (Example 22), also exhibited increased washability as compared with Example 6.

The urea-formaldehyde resin employed in making the above tests were of the kind now widely obtainable on the market and sold under various trade names, and, as indicated with relation to Examples 8 through 26, 20 grams thereof were used for each test. These resins are freely soluble in water, and will completely dissolve in the quantities of water stated in the examples to form solutions ranging from clear to opaque, depending on the particular resin used. After the product has been cured by means of the alkaline-earth hydroxide, it forms a white, substantially opaque coating or composition in which the alkaline earth hydroxide has in some way combined with the urea-formaldehyde condensation product with the formation of a water-insoluble water-resistant complex, the exact nature of which is not definitely known.

It is of course self-evident that the composition can be given various tints or colors either by the addition of dyes thereto or the incorporation of pigments therewith. When pigments are used they must of course be of the kind which will not be adversely affected by the alkaline earth hydroxide and conversely which will not combine therewith, therefore withdrawing it from the mixture so as to render it incapable of reacting with the urea-formaldehyde condensation product. Inasmuch as "lime-proof" colors such as are used in calcimines and similar coating compositions are thoroughly well known to the industry, it does not appear necessary to give a list of suitable pigments at this point.

What is considered novel, in connection with the present invention, is the discovery that alkaline earth hydroxides such as those of calcium, magnesium, strontium, and barium, in combination with the water-soluble urea-formaldehyde condensation product, are capable of causing the insolubilization of said condensation products in the cold, that is to say, at room temperature, within a reasonable time.

In general, a washability of 100 or better will qualify the product as satisfactory, although some combinations, for instance Examples 9, 23, and 24, showed the possibility of producing exceptionally good products, when judged from the viewpoint of resistance to wet abrasion. How little, for example in the case of calcium hydroxide, can be used, is shown by Example 12, where 10 grams of a saturated solution of calcium hydroxide were used with 20 grams of the resin. This, based upon the solubility of calcium hydroxide in water at 25° C., would amount to only 0.0159 gram of $Ca(OH)_2$ to 20 parts of the resin, or about 0.08%. However, as shown by Examples 1, 2, and 8, up to 100% of calcium hydroxide can be used with the resin, and still produce a satisfactory product.

It will be self-evident that the oxides of the alkaline earths may be used with equal effect, as they readily are converted into the corresponding hydroxides upon reaction with water, such as is used in preparing the compositions, and such use is considered to be within the purview of the claims. Also, the term "lime" is intended to cover both high-calcium as well as magnesium-containing limes.

In case of the more soluble alkaline earth hydrates, however, small amounts are better than large amounts. It is also to be understood, in the interpretation of the subjoined claims, that magnesium is considered to be one of the alkaline earth metals, particularly in view of the fact that it so often is associated in nature with calcium, as for instance in dolomitic rocks and limes.

From the viewpoint of economy, lime products are the preferred embodiments of the present invention, for which applicants claim:

1. A powdered composition suitable for conversion into a self-hardening coating or adhesive composition by the addition of water, whose principal active ingredient consists of a water-soluble urea-formaldehyde condensation product and, as the sole insolubilizing agent for said condensation product, up to 100% by weight of the latter of an hydrated alkaline earth oxide reactive therewith to insolubilize said condensation product from its aqueous solution at normal room temperature.

2. The composition as defined in claim 1 in which the hydrated alkaline earth oxide is that of calcium.

3. The composition as defined in claim 1 in which the hydrated alkaline earth oxide is that of strontium.

4. The composition as defined in claim 1 in which the hydrated alkaline earth oxide is that of barium.

HERMAN A. SCHOLZ.
JOHN K. WISE.

REFERENCES CITED

The following references are of record in the file of this patent:

UNITED STATES PATENTS

| Number | Name | Date |
| --- | --- | --- |
| 2,200,164 | Durant | May 7, 1940 |
| 2,348,244 | Dearing | May 9, 1944 |